US 9,551,776 B2

United States Patent
Jones et al.

(10) Patent No.: US 9,551,776 B2
(45) Date of Patent: Jan. 24, 2017

(54) METHODS AND APPARATUS TO DETERMINE A POSITION USING LIGHT SOURCES

(71) Applicant: The Boeing Company, Chicago, IL (US)

(72) Inventors: Richard Donovan Jones, Bellevue, WA (US); Darin W. Brekke, Fox Island, WA (US); Dan J. Clingman, Milton, WA (US)

(73) Assignee: THE BOEING COMPANY, Chicago, IL (US)

( * ) Notice: Subject to any disclaimer, the term of this patent is extended or adjusted under 35 U.S.C. 154(b) by 227 days.

(21) Appl. No.: 14/275,483

(22) Filed: May 12, 2014

(65) Prior Publication Data

US 2015/0323647 A1    Nov. 12, 2015

(51) Int. Cl.
G01B 11/14   (2006.01)
G01S 1/70    (2006.01)
G01S 5/16    (2006.01)

(52) U.S. Cl.
CPC ... *G01S 1/70* (2013.01); *G01S 5/16* (2013.01)

(58) Field of Classification Search
CPC combination set(s) only.
See application file for complete search history.

(56) References Cited

U.S. PATENT DOCUMENTS

| 8,248,467 | B1 | 8/2012 | Ganick et al. |
| 8,284,100 | B2 | 10/2012 | Vartanian et al. |
| 9,157,795 | B1 * | 10/2015 | Linnell ............... G01J 1/4257 |
| 2002/0071161 | A1 | 6/2002 | Perkins et al. |
| 2002/0089722 | A1 | 7/2002 | Perkins et al. |
| 2010/0208236 | A1 | 8/2010 | Demink |
| 2011/0176803 | A1 | 7/2011 | Song et al. |
| 2012/0162633 | A1 * | 6/2012 | Roberts ............... G01S 5/16 356/5.09 |

FOREIGN PATENT DOCUMENTS

| CN | 102980574 | 3/2013 |
| CN | 103033834 | 4/2013 |
| JP | 2005077172 A | 3/2005 |

OTHER PUBLICATIONS

European Patent Office, "Search Report," issued in connection with the European application No. 15165181.7, on Oct. 30, 2015 (6 pages).
Haas, "Li-Fi: High Speed Wireless Communications via Light Bulbs," Jun. 19, 2013, 58 pages.
Clifford, "ByteLight Solves Indoor GPS Mapping Problem with LED Lighting," Jan. 8, 2013, 4 pages.
Lamonica, "Philips Creates Shopping Assistant with LEDs and Smart Phone," Feb. 18, 2014, 2 pages.

* cited by examiner

*Primary Examiner* — Tri T Ton
(74) *Attorney, Agent, or Firm* — Hanley, Flight & Zimmerman, LLC

(57) ABSTRACT

Methods and apparatus to determine a position using light sources are disclosed. An example method includes processing an output of a photodetector based on anticipated codes to identify multiple light sources from which the photodetector receives light at a first position, determining locations of the identified light sources; and determining a location of the first position based on the locations of the identified light sources.

19 Claims, 7 Drawing Sheets

METHODS AND APPARATUS TO DETERMINE A POSITION USING LIGHT SOURCES

FIELD OF THE DISCLOSURE

This disclosure relates generally to position determination and, more particularly, to methods and apparatus to determine a position using light sources.

BACKGROUND

Satellite-based positioning systems are used for relatively precise measurements of global location. However, the signals used in satellite-based positioning systems are often unavailable or unreliable in non-line of sight (NLOS) environments. Therefore, there is a need for precise positioning in locations in which satellite-based positioning systems are unavailable.

SUMMARY

Example methods disclosed herein include processing an output of a photodetector based on anticipated codes to identify multiple light sources from which the photodetector receives light at a first position, determining locations of the identified light sources, and determining a location of the first position based on the locations of the identified light sources.

Example apparatus disclosed herein include a photodetector to convert received light to an electrical signal, a code extractor to identify anticipated codes in the electrical signal, a light source identifier to identify multiple light sources and respective locations of the light sources based on the code extractor identifying the anticipated codes, and a location determiner to determine a location based on the identified light sources and the locations of the identified light sources.

The features, functions, and advantages that have been discussed can be achieved independently in various examples or may be combined in yet other examples further details of which can be seen with reference to the following description and drawings.

BRIEF DESCRIPTION OF THE DRAWINGS

Wherever appropriate, the same reference numbers will be used throughout the drawing(s) and accompanying written description to refer to the same or like parts.

DETAILED DESCRIPTION

Light Emitting Diode (LED) lighting is advantageously used in factory and/or other indoor settings to provide visible light while improving energy efficiency and cost savings over incandescent or fluorescent lighting. In addition to energy efficiency, example methods and apparatus disclosed herein modulate LEDs to transmit a unique pseudorandom sequence from each LED-based light source to provide a light-based positioning system.

By using a pseudorandom sequence, example methods and apparatus disclosed herein measure the precise time of flight (and, therefore, distance measurements from each LED transmission fixture) from uniquely-identifiable light sources to a receiver, even in noisy ambient lighting conditions. In some disclosed examples, the pseudorandom sequence encoded in (e.g., modulated in) the light enables the receiver to detect the pseudorandom code in the signal even when the signal is below the background noise level. By using multiple distances to different light sources and the known locations of those light sources, example methods and apparatus triangulate the position of a receiver to determine its location within an environment (e.g., indoors). Example methods and apparatus further determine a three-dimensional location including altitude (e.g., altitude relative to the LED light sources) and the time offset between the LED light sources and the receiver (e.g., a local or reference time used by the LED light sources). If the height of the receiver has already been determined by another method (e.g., being consistently positioned a fixed distance above the floor surface), disclosed examples determine a reduced solution including a two-dimensional horizontal position and the receiver time offset, which enhances operation of the receiver when the light signal reception by the receiver is substantially reduced.

Example methods and apparatus disclosed herein provide the benefits of precise three-dimensional navigation in locations where other precise positioning systems (e.g., satellite positioning systems) are unavailable. Examples disclosed herein enable rapid and precise location control for use in applications such as factory automation, retail (e.g., shopping mall or store) and/or warehouse navigation, and/or navigation of autonomous vehicles in indoor environments (e.g., in parking structures, transportation tunnels, etc.). Furthermore, examples disclosed herein do not require machine vision or other costly or error-prone positioning techniques, and may be implemented using low cost equipment (e.g., receiver circuits). Examples disclosed herein are implemented without using radio frequencies (RF) and therefore may be free of RF spectrum limitations and/or governmental (e.g., United States Federal Communications Commission (FCC)) regulation.

Figure 1:
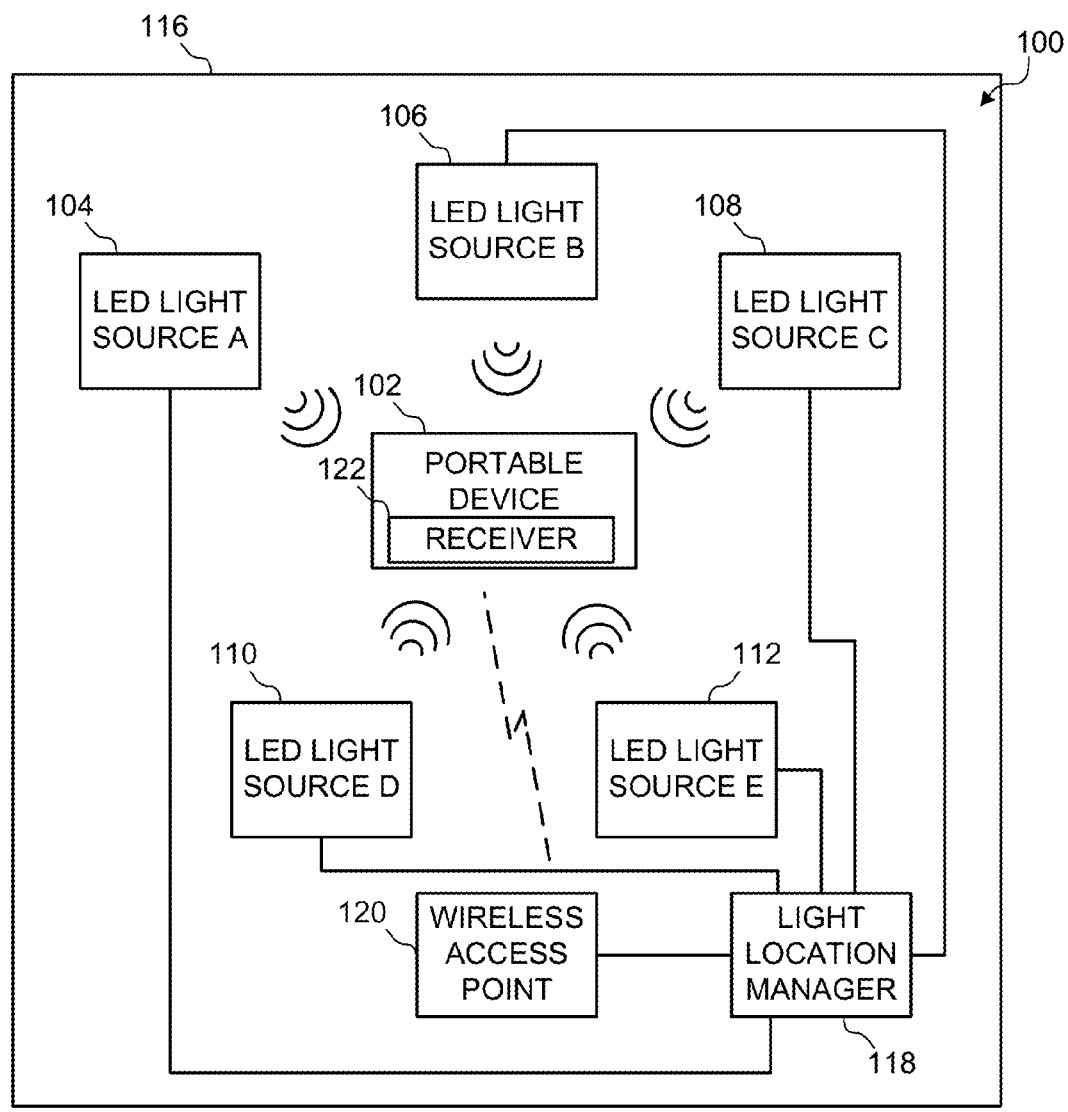
FIG. 1 is a block diagram of an example system to determine a position of a receiver device using light sources.

FIG. 1 is a block diagram of an example system 100 to determine a position of a portable device 102 using light sources 104-112. In the example of FIG. 1, the portable device 102 includes a receiver 122, which can determine the position of the portable device 102. The position of the portable device 102 of FIG. 1 is determined relative to a defined area 116 (e.g., using a coordinate system defined for a building or campus) and/or with reference to a larger position system (e.g., using satellite positioning system coordinates, such as WGS84).

Example portable devices 102 that may be used with the system 100 include, but are not limited to, mobile robots or other autonomous mobile machines, lifting devices (e.g., cranes), handheld devices capable of displaying a location of the device to a user, and/or tracking devices (e.g., inventory tracking, material tracking, device tracking, etc.). The portable device 102 may execute services or software applications that likewise depend on a location and/or timing relative to the area 116 and/or the system 100.

The example light sources 104-112 of FIG. 1 each include one or more light-emitting diode (LED) lights. The example light sources 104-112 may be fixed banks of lighting (e.g., ceiling-mounted lights) and/or movable light sources (e.g., portable LED lamps). The outputs of the LED lights can be modulated at high frequencies to enable the LED lights to transmit data without human-observable flickering. In some examples, each of the light sources 104-112 uses multiple LEDs arranged to enable space-shifted keying, on-off keying, and/or other spatially-dependent modulation schemes. Each of the example light sources 104-112 is in a known position in the example area 116. However, the positions of one or more of the light sources 104-112 may be changed.

The system 100 of the illustrated example includes a light location manager 118 to monitor and store the locations of the light sources 104-112. The locations of one or more of the light sources 104-112 may be fixed relative to the area 116. In some examples, the locations of the fixed ones of the light sources 104-112 are manually surveyed and provided to the light location manager 118, which stores the location of each surveyed light source 104-112 in association with an identifier of that light source 104-112. The light location manager 118 may then provide a light source 104-112 with the location of the light source 104-112 (e.g., when the light source is initialized).

In the example of FIG. 1, one or more of the light sources 104-112 (e.g., the light source 112 in this example) derives its position in the area 116 based on the positions of the other light sources. In this manner, the light source 112 performs a self-positioning procedure similar to the positioning procedure performed by the portable device 102. Examples of the positioning procedure are disclosed below. When the light source 112 has derived its position in the area 116, the example light source 112 provides the derived position to the light location manager 118.

The example light location manager 118 updates the portable device 102 with the locations of the light sources 104-112 via a secondary data channel. For example, the portable device 102 is communicatively connected to a wireless access point 120, which provides a data channel for communication with the portable device 102. The wireless access point 120 may be one of a network of wireless access points in the area 116. The portable device 102 is permitted to access one or more communication networks via the wireless access point 120, such as one or more intranets, internets, and/or the Internet. Additionally, the wireless access point 120 enables the portable device 102 to obtain location updates for the light sources 104-112 from the light location manager 118. In some examples, the light location manager 118 provides the portable device 102 with any other updates to the light sources 104-112, such as changes in pseudorandom codes transmitted by respective ones of the light sources 104-112.

To determine a position of the portable device 102, the example portable device 102 includes the receiver 122. The example receiver 122 of FIG. 1 determines a position of the portable device 102 based on receiving respective light signals from the light sources 104-112. In the example of FIG. 1, the receiver 122 receives light signals from the light sources 104-112 with or without a line-of-sight to the light sources 104-112. Each of the light signals from the light sources 104-112 transmits a unique pseudorandom code. As used herein, the term "pseudorandom code" refers to a code that appears to be random (e.g., random noise) but is a deterministic sequence that repeats itself after a defined period. In some examples, the unique pseudorandom codes are selected to have low correlations with each other (e.g., orthogonal). Examples of such codes are used by the Global Positioning System (GPS). The example light sources 104-112 may use the 1024 bit "Gold" codes used by GPS. Different codes (e.g., longer codes, shorter codes) may also be used that have higher co-correlation (e.g., pseudorandom codes that have more correlation with each other than the GPS Gold codes). However, use of other codes having higher co-correlation permits the use of a larger number of unique pseudorandom codes than the GPS Gold codes. In this example, the pseudorandom code transmitted from a light source (e.g., the light source 104) is a code that appears to be random noise but is selected to be different than the code of any of the other light sources 106-112. The pseudorandom codes are modulated in the light transmitted by the light sources 104-112.

In some examples, each of the light sources 104-112 repeats its respective pseudorandom code at known, predictable intervals (e.g., every 1 millisecond) to enable the receiver 122 to lock onto the pseudorandom code and/or to continuously determine its location once locked on. In some other examples, each of the light sources 104-112 transmits a sequence of pseudorandom codes. The sequence of pseudorandom codes is known to the light sources 104-112, to the light location manager 118, and to the receiver 122. When a light source 104-112 reaches the end of a code sequence, the example light source 104 repeats the code sequence from the beginning.

The light sources 104-112 of FIG. 1 may transmit the respective pseudorandom codes in synchrony (e.g., via different frequencies). Additionally or alternatively, the example light sources 104-112 may transmit the respective pseudorandom codes at respective overlapping or non-overlapping epochs.

As explained in more detail below, the example receiver 122 determines a position of the portable device 102 by: 1) identifying pseudorandom codes in the received light (e.g., codes from light sources 104-112 which transmit light that can be observed directly or indirectly by the receiver 122); 2) identifying the light sources 104-112 corresponding to the pseudorandom codes; 3) determining distances from each of the identified light sources 104-112; 4) determining locations of each of the identified light sources 104-112; and 5) determining (e.g., triangulating) a position of the portable device 102 from the respective locations of the identified light sources 104-112 and the respective distances to the identified light sources 104-112. In some examples, the receiver 122 further determines a relative time (e.g., a time relative to a reference) when a sufficient number of light sources 104-112 are identified (e.g., 4 of the light sources 104-112).

Figure 2:
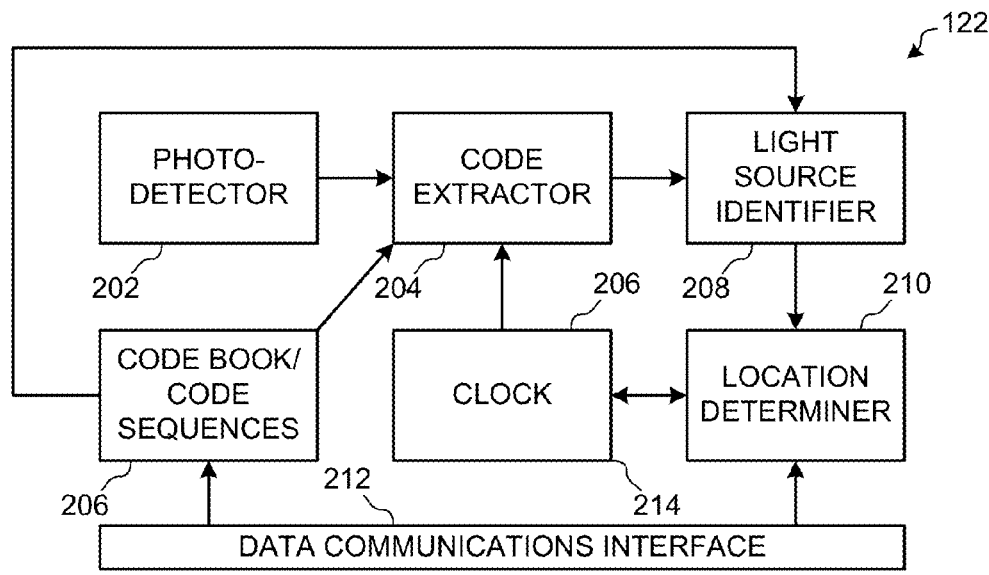
FIG. 2 is a more detailed block diagram of the example receiver of FIG. 1.

FIG. 2 is a more detailed block diagram of the example receiver 122 of FIG. 1. The example receiver 122 of FIG. 2 includes a photodetector 202, a code extractor 204, a code book 206, a light source identifier 208, a location determiner 210, and a data communications interface 212.

The example photodetector 202 is exposed to the ambient lighting conditions of the area in which the receiver 122 is located (e.g., the area 116 of FIG. 1). The photodetector 202 outputs an electrical signal representative of the ambient lighting. In the example of FIGS. 1 and 2, the photodetector 202 detects and generates an output based on visible light. However, in some examples the photodetector 202 may be responsive to infrared, ultraviolet, and/or other near-visible light wavelengths.

The example code extractor 204 receives the electrical signal generated by the photodetector 202. The code extractor 204 extracts pseudorandom codes that are present in the electrical signal by, for example, de-modulating the baseband electrical signals using the carrier frequency selected for the light sources 104-112. In some examples, the light sources modulate the pseudorandom codes assigned to the light sources 104-112 (e.g., the codes assigned to each of the possible light sources 104-112) at respective carrier frequency(ies). The pseudorandom codes of the light sources 104-112 are known to the receiver 122 and are stored in the code book 206. The example code book 206 provides the codes to the code extractor 204 for use in identifying the pseudorandom codes in a demodulated electrical signal.

In some examples, the code extractor 204 performs code alignment using, for example, a correlator to determine the correct frequency and starting of a particular pseudorandom code. In some such examples, the code extractor 204 identifies the anticipated codes by correlating the demodulated electrical signal to each of the anticipated pseudorandom codes. If a pseudorandom code has at least a threshold correlation to the demodulated electrical signal, the code extractor 204 determines that the electrical signal contains that pseudorandom code and can determine a received time (e.g., a start time, an epoch time) of the pseudorandom code. Thus, the example code extractor 204 may repeatedly process the electrical signal to identify the start of one or more pseudorandom codes that are present in the signal.

In some other examples, the code extractor 204 may use a matched filter to more rapidly determine the alignment of all of the codes by effectively testing all alignments sequentially and continuously. In some other examples, little or no frequency shifting and/or velocity differences occur in the light signals due to relatively close range between the light sources 104-112 and the receiver 122. Other filters may additionally or alternatively be used.

In some examples, the code extractor 204 identifies 3, 4, or more unique pseudorandom codes in the demodulated electrical signal. To identify multiple pseudorandom codes in the demodulated electrical signal, the example code extractor 204 determines a correlation between the demodulated electrical signal and each of the anticipated pseudorandom codes. When a pseudorandom code has a high correlation with the demodulated signal, the example code extractor 204 determines that the pseudorandom code is present in the signal and determines a start time of the pseudorandom code (e.g., using a clock 214).

When the code extractor 204 has determined the code alignment, the example code extractor 204 provides the pseudorandom code for which the alignment was determined to the light source identifier 208. The example light source identifier 208 determines an identifier of one of the light sources 104-112 based on the identified pseudorandom code. For example, the light source identifier 208 may search the code book 206 to determine which of the light sources 104-112 is associated with the identified code. The codes stored in the code book 206 are therefore anticipated or expected codes that could be expected to be represented in the output of the photodetector 202, depending on the location of the receiver 202 in the area 116. The example code book 206 returns an identifier of the light source 104-112 corresponding to (e.g., assigned to) an identified pseudorandom code. In the example of FIG. 2, the code book 206 also provides the location (e.g., coordinates and/or altitude within the area 116) and an epoch for the identified light source 104-112. The epoch defines the times (e.g., the expected start and/or end times) of the transmissions of the pseudorandom code by the identified light source 104-112. To enable precise location determination by the receiver 122, clocks of the light sources 104-112 that control the timing of the epochs in the example of FIG. 1 are synchronized.

The example light source identifier 208 and/or the location determiner 210 may perform despreading using an identified pseudorandom code to identify a message. The message transmitted by the light source 104-112 (and spread using the pseudorandom code) may provide information about the light source 104-112 that transmitted the message, a local time at which the message was transmitted, and/or any other information. If the message includes the local time, the example light source identifier 208 and/or the location determiner 210 may determine a local time (when the clock 214 of the receiver 122 has been synchronized) based on the time at which the message was transmitted from the light source 104-112 and the propagation time of the message to the receiver 122.

The example location determiner 210 determines a location of the example receiver 122 (and, thus, the device containing the receiver 122) based on extracting the pseudorandom codes from the electrical signal, the epochs and locations of the light sources 104-112 from which pseudorandom codes were received, and the times at which the pseudorandom codes are received (e.g., each time at which the start of a pseudorandom code is received, each time at which the end of a pseudorandom code is received, etc.).

To determine the location of the receiver 122, the location determiner 210 determines a clock offset of the clock 214. For example, if the light sources 104-112 are configured to transmit the codes in synchrony, the location determiner 210 compares the received times of the pseudorandom codes and determines a location and time at which the pseudorandom codes would be received at the respective times (e.g., based on the codes being transmitted at a same time from the respective locations of the light sources 104-112 assigned those codes). When the location is determined, the example location determiner 210 determines the time at which the signals were transmitted to reach the determined location at the respective times. The location determiner 210 then synchronizes the clock 214 with the determined time. In other words, the location determiner 210 synchronizes the clock 214 to a location and time at which the received codes are consistent with the observed timing and the known locations of the light sources 104-112.

Based on the determined time, the example location determiner 210 determines distances to each of the example light sources 104-112 from which pseudorandom codes were received. For example, to determine a distance between the receiver 122 and one of the light sources (e.g., the light source 104) the location determiner 210 multiplies the propagation velocity of light through the atmosphere by a time difference between a) the calculated transmission of the pseudorandom codes (e.g., based on the synchronized clock 214) and b) the time at which the pseudorandom code for the light source 104 was received at the photodetector 202 (which may be determined from the time at which the code extractor 204 received the electrical signal from the photodetector 202). The location determiner 210 then triangulates the position of the receiver 122 using the calculated distances to the light sources 104-112 and the known locations of the light sources 104-112. Example pseudorange equations (1)-(4) that may be solved in combination to determine the position of the receiver are shown below:

$$P_1 = \sqrt{(x_1-x)^2+(y_1-y)^2+(z_1-z)^2} + c\tau - c\tau_1 \quad \text{Equation (1)}$$

$$P_2 = \sqrt{(x_2-x)^2+(y_2-y)^2+(z_2-z)^2} + c\tau - c\tau_2 \quad \text{Equation (2)}$$

$$P_3 = \sqrt{(x_3-x)^2+(y_3-y)^2+(z_3-z)^2} + c\tau - c\tau_3 \quad \text{Equation (3)}$$

$$P_4 = \sqrt{(x_4-x)^2+(y_4-y)^2+(z_4-z)^2} + c\tau - c\tau_4 \quad \text{Equation (4)}$$

In Equations (1)-(4), $P_n$ is the pseudorange measured from light source n, $x_n$ is the x-axis location of light source n, $y_n$ is the y-axis location of light source n, $z_n$ is the z-axis location of light source n, $c\tau_n$ is the time of reception at the receiver 122 of the light signal containing the pseudorandom code transmitted by light source n at time T. The example location determiner 210 solves Equations (1)-(4) for x, y, and z, which provides the location of the receiver 122 in the x, y, z coordinate system. In some examples, the location determiner 210 solves Equations (1)-(4) using a statistical method such as least squares error or the like.

In some other examples, the location determiner 210 solves the location of the receiver 210 using a state estimator such as a Kalman Filter that estimates the position state (and other aspects such as biases) using the calculated pseudoranges.

In some examples, the location determiner 210 combines the location solution determined using the photodetector 202 with location solutions determined using other methods such as an inertial measurement unit and/or a wheel encoder. For example, after a first position is determined via the photodetector 202, the example location determiner 210 may verify that subsequent location solutions are consistent with relative motion detected via the inertial measurement unit and/or a wheel encoder (or rotary encoder).

The example receiver 122 may propagate the calculated time and/or location to other components and/or applications of the portable device 102 for use in accomplishing the location-dependent and/or time-dependent tasks of the portable device 102.

The example data communications interface 212 communicates with the example light location manager 118 (e.g., via the wireless access point 120) to, for example, update (e.g., in the code book 206) the locations of the light sources 104-112, the pseudorandom codes used by the light sources 104-112, the epochs of the light sources 104-112, and/or any other information for determining the position of the receiver 122. In some examples, the data communications interface 212 is a wireless communications interface (e.g., an IEEE 802.xx wireless interface). In some other examples, the data communications interface 212 is a wired interface that connects to a local network.

While the example above describes a single photodetector 202 and a single code detection channel including a single code extractor 204, the example receiver 122 of FIGS. 1 and/or 2 may include multiple photodetectors 202 and/or multiple channels (e.g., multiple code extractors 204). For example, a single photodetector 202 may provide an output signal to multiple code extractors 204 to perform faster, simultaneous code extraction of multiple codes from the signal. When one of the code extractors 204 identifies and/or locks onto a code (e.g., a code in the code book 206), the identifying code extractor 204 informs the remaining channels (e.g., code extractors 204) that the code has been identified, and the other channels search for different codes.

In some other examples, the receiver 122 includes multiple photodetectors 202, which output signals to multiple channels (e.g., code extractors 204). Using multiple photodetectors 202, the example receiver 122 may mitigate multipath effects by creating different fields of view for different ones of the photodetectors 202 (e.g., by orienting the photodetectors 202 to receive light signals from a particular field of view). In some examples, two or more of the photodetectors 202 are spatially diverse and have a field of view in the upward direction (e.g., toward light sources located on the ceiling of the environment) to mitigate shading effects or signal blockages due to other objects in the area. In some examples, by making the multiple photodetectors spatially diverse, the example location determiner 210 determines the attitude (e.g., orientation) of the receiver 122 and/or the portable device 102 by determining time differences between receipt of light signals at different sources.

Figure 3:
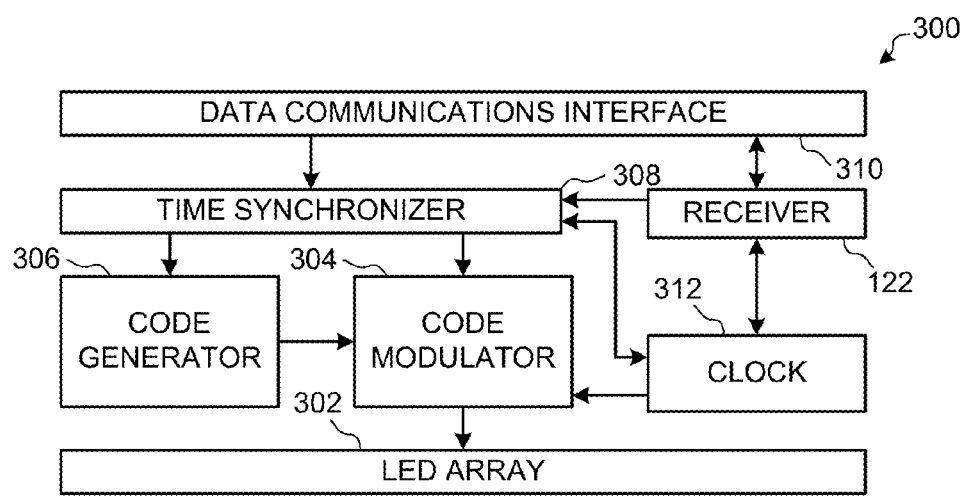
FIG. 3 is a block diagram of an example light source to implement any of the light sources of FIG. 1.

FIG. 3 is a block diagram of an example light source 300 to implement any of the light sources 104-112 of FIG. 1. The example light source 300 of FIG. 3 includes an LED array 302, a code modulator 304, a code generator 306, a time synchronizer 308, and a data communications interface 310. The example light source 300 of FIG. 3 further includes the example receiver 122 of FIGS. 1 and 2, the description of which will not be repeated below.

The example LED array 302 of FIG. 3 produces visible light. Additionally or alternatively, the LED array 302 may produce infrared, ultraviolet light, and/or any other near-visible light wavelengths. The LED array 302 is capable of modulating the light transmitted by the LED 302 (e.g., via on-off keying, variable pulse position modulation, etc.) to transmit data.

The LED array 302 of the illustrated example transmits, via the visible light, data provided by the code modulator 304. The example code modulator 304 of FIG. 3 modulates the pseudorandom code assigned to the light source 300 (stored in and/or generated by the code generator 306) for transmission via the LED array 302. For example, the code modulator 304 may receive the pseudorandom code from the code generator 306, select a modulation scheme, and generate a control signal for the LED array 302. The code modulator 304 and/or the code generator 306 include a clock 312 to enable transmission of the pseudorandom code at a designated time (e.g., in synchrony with other light sources, at a time reserved for the light source 300, etc.).

Modulation via the LED array 302 may use, for example, orthogonal frequency division multiplexing (OFDM), quadrature amplitude modulation (QAM), spatial modulation, space shift keying, and/or any other type of modulation scheme(s).

The example time synchronizer 308 of FIG. 3 synchronizes the clock 312 to enable precise synchronization of code transmission with the other light sources. As used herein, time synchronization is defined to mean having the same (or derivable) values (within a margin of error), and does not necessarily include transmitting signals in synchrony. For example, two clocks may be synchronized if a) the clocks are set to have a same value at the same moment (within a margin of error) and/or b) if the clocks are set such that a first clock is set to have a first designated value at the same moment that the second clock has a second designated value derivable from the first designated value. As used herein, "in synchrony" is defined to mean performing actions simultaneously (within a margin of error).

The example time synchronizer 308 may synchronize the time by, for example, accessing a common time base shared by all of the light sources in the positioning system (e.g., the system 100 of FIG. 1). An example of such a common time base might be the phase of an alternating current (AC) mains power supply that is provided to all of the light sources. The example time synchronizer 308 may determine the time of a designed phase of the common time base and synchronize the clock 312 based on the phase. Because the propagation time of the AC mains power supply may be different for different light sources (e.g., different ones of the light sources 104-112 may see a given phase of the AC mains power supply at different times), the example time synchronizer 308 of FIG. 3 determines the propagation time difference(s) between the light source 300 and one or more other light sources to synchronize on the AC mains power supply.

As an example, the time synchronizer 308 may repeatedly perform ranging pings via the AC mains power supply with a reference node connected to the AC mains power supply. For example, the time synchronizer 308 may send a first test ping via the AC mains power supply circuit to the other time synchronizer, which returns a second test ping time synchronizer 308 upon receipt of the first test ping. The round trip time, less the processing time, multiplied by the propagation speed of the signal and divided by two results in an estimate of the electrical distance between the time synchronizer 308 and the reference node. By placing the reference node at a location accessible to the light sources 104-112, the example time synchronizers 308 of the light sources 104-112 can determine their respective delays relative to the reference node and select respective phases of the AC mains power supply signal to result in synchronization.

In some examples, the time synchronizer 308 selects the AC mains power supply phase for use in synchronization when the time synchronizer 308 performs a receiver-based synchronization as described above. For example, after synchronizing to a reference light source, the example time synchronizer 308 determines the applicable phase of the signal to maintain synchrony with the reference light source (e.g., determines the phase of the AC mains power supply at the time the reference light source transmitted its code that was received at the light source 300). Thus, the example time synchronizer 308 tracks the determined phase to maintain synchrony and may re-synchronizes to the reference light source at longer intervals (e.g., less often).

In some other examples, the time synchronizer 308 is provided with the location (e.g., a surveyed location) of a reference light source (which is not the light source 300) and the location (e.g., a surveyed location) of the light source 300 (e.g., from the light location manager 118 of FIG. 1 via the data communications interface 310). Additionally or alternatively, the time synchronizer 308 may receive the distance between the reference light source and the light source 300. The example time synchronizer 308 also receives a time at which a pseudorandom code assigned to the reference light source (e.g., received from the light location manager 118 of FIG. 1 via the data communications interface 310) is received at the receiver 122 of FIG. 3. Based on the time determined by the receiver 122, the distance between the reference light source and the light source 300, and the speed of light through the atmosphere, the example time synchronizer 308 determines the time at which the reference light source transmitted the pseudorandom code. The example time synchronizer 308 then synchronizes the clock 312 (and/or the code generator 306) to cause the code modulator 304 and the LED array 302 to transmit the pseudorandom code precisely at the epoch of the light source 300.

Multiple example light sources 104-112 that include the receiver 122 of FIGS. 2 and 3 may be synchronized to a reference light source. For example, the light sources 104-112 may be synchronized in succession by synchronizing first light source(s) that are in communication range of the reference light source, then synchronizing second light source(s) that are in communication range of the first synchronized light source(s) but not in communication range of the reference light source, and so on.

The example data communications interface 310 transmits and receives data via, for example, the wireless access point 120 of FIG. 1. In some examples, the data communications interface 310 is a wireless communications interface (e.g., an IEEE 802.xx wireless interface). In some other examples, the data communications interface 310 is a wired interface that connects to a local network. The example data communications interface 310 enables the time synchronizer 308 to receive location and/or pseudorandom code updates from the light location manager 118. Additionally or alternatively, the receiver 122 may update the light location manager 118 via the data communications interface with a current location of the light source 300 (e.g., if the light source 300 has been moved).

Figure 4:
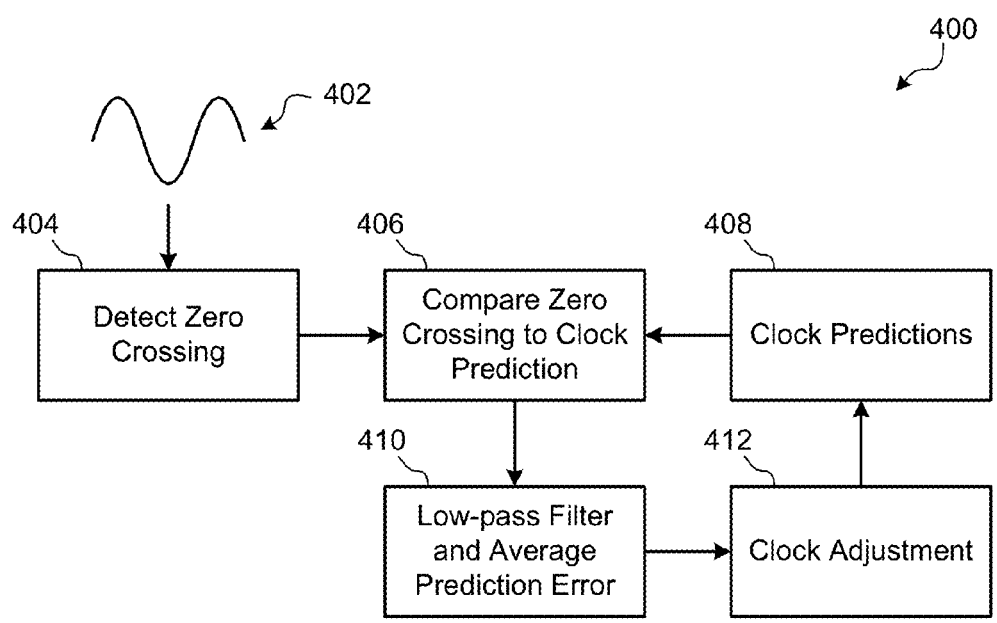
FIG. 4 is a flow diagram of an example light source synchronization process to synchronize the example light sources of FIG. 1.

FIG. 4 is a flow diagram of an example light source synchronization process 400 to synchronize the example light sources 104-112 of FIG. 1. The example light source synchronization process 400 may be performed by the example time synchronizer 308 of FIG. 3 for each of the example light sources 104-112.

The example time synchronizer 308 of the light source 300 receives a same AC power supply signal as other ones of the light sources 104-112. The relative timing between the light sources 104-112 can be maintained by reference to the power grid AC signal 402. As illustrated in FIG. 4, the example time synchronizer 308 detects zero crossings 404 of the supplied AC signal 402. The time synchronizer 308 compares 406 times of the measured zero crossings to the zero crossing times predicted 408 by the local clock 312 of the light source 300. The time synchronizer 308 filters (e.g., low-pass filters) the differences between the measured zero crossing times and the crossing times predicted by the local clock 312 (e.g., prediction error) are filtered (e.g., low-pass filtered) and averaged 410. The time synchronizer 308 calculates a clock adjustments 412 from the processed prediction errors, and feeds the clock adjustments 412 to the clock 312, which generates new predictions 408 based on the adjustments. Each light source 104-112 in the example system 100 of FIG. 1 performs the example process 400. While the clocks of all of the light sources 104-112 may drift as the shared AC signal fluctuates, the relative timing between the transmitter clocks of the light sources 104-112 is maintained.

The relative timing between each of the light sources 104-112 in the example system 100 can be additionally or alternatively be resolved through system calibration. For example, pairs of the light sources 104-112 may perform a two-way time transfer, in which a first light source (e.g., the light source 104) sends a signal to a second light source (e.g., the light source 106). The second light source 106 returns the signal to the first light source 104, enabling the two-way time of transmission and relative clock offset to be computed by the time synchronizers 308 of the light sources 104-106. The light sources 104-112 may transmit the first and second signals via the facility AC power infrastructure, through a secondary wired or wireless channel, and/or by light transmission between the light sources 104-112. In other examples, the example receiver 122 of FIG. 1 is moved within the system 100 during system calibration process. The example receiver 122 estimates the relative locations and time delays of the light sources 104-112, which are then provided to the time synchronizers 308 of the light sources 104-112 (e.g., via the light location manager 118) to adjust the respective clocks 308.

While an example manner of implementing the receiver 122 and the light sources 104-112 of FIG. 1 are illustrated in FIGS. 2 and 3, one or more of the elements, processes and/or devices illustrated in FIGS. 2 and 3 may be combined, divided, re-arranged, omitted, eliminated and/or implemented in any other way. Further, the example photodetector 202, the example code extractor 204, the example code book 206, the example light source identifier 208, the example location determiner 210, the example data communications interfaces 212, 310, the clocks 214, 312, the example LED array 302, the example code modulator 304, the example code generator 306, the example time synchronizer 308 and/or, more generally, the example receiver 122 and the light sources 104-112 of FIG. 1 may be implemented by hardware, software, firmware and/or any combination of hardware, software and/or firmware. Thus, for example, any of the example photodetector 202, the example code extractor 204, the example code book 206, the example light source identifier 208, the example location determiner 210, the example data communications interfaces 212, 310, the clocks 214, 312, the example LED array 302, the example code modulator 304, the example code generator 306, the example time synchronizer 308 and/or, more generally, the example receiver 122 and the light sources 104-112 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example photodetector 202, the example code extractor 204, the example code book 206, the example light source identifier 208, the example location determiner 210, the example data communications interfaces 212, 310, the clocks 214, 312, the example LED array 302, the example code modulator 304, the example code generator 306, and/or the example time synchronizer 308 is/are hereby expressly defined to include a tangible computer readable storage device or storage disk such as a memory, a digital versatile disk (DVD), a compact disk (CD), a Blu-ray disk, etc. storing the software and/or firmware. Further still, the example the example receiver 122 and the light sources 104-112 of FIG. 1 may include one or more elements, processes and/or devices in addition to, or instead of, those illustrated in FIGS. 2 and/or 3, and/or may include more than one of any or all of the illustrated elements, processes and devices.

Figure 5:
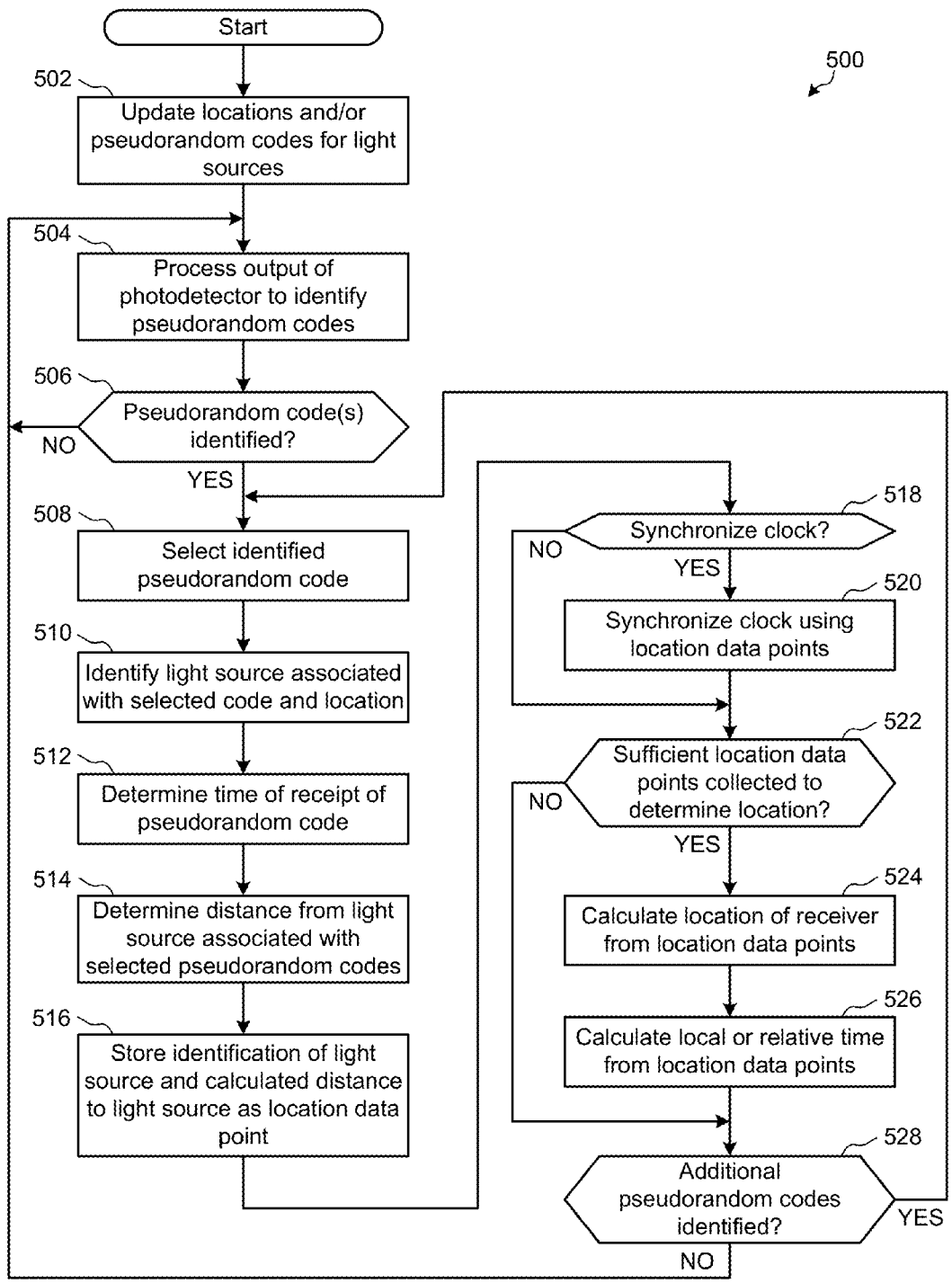
FIG. 5 is a flowchart of an example method to determine a position of a receiver device using light sources.
Figure 6:
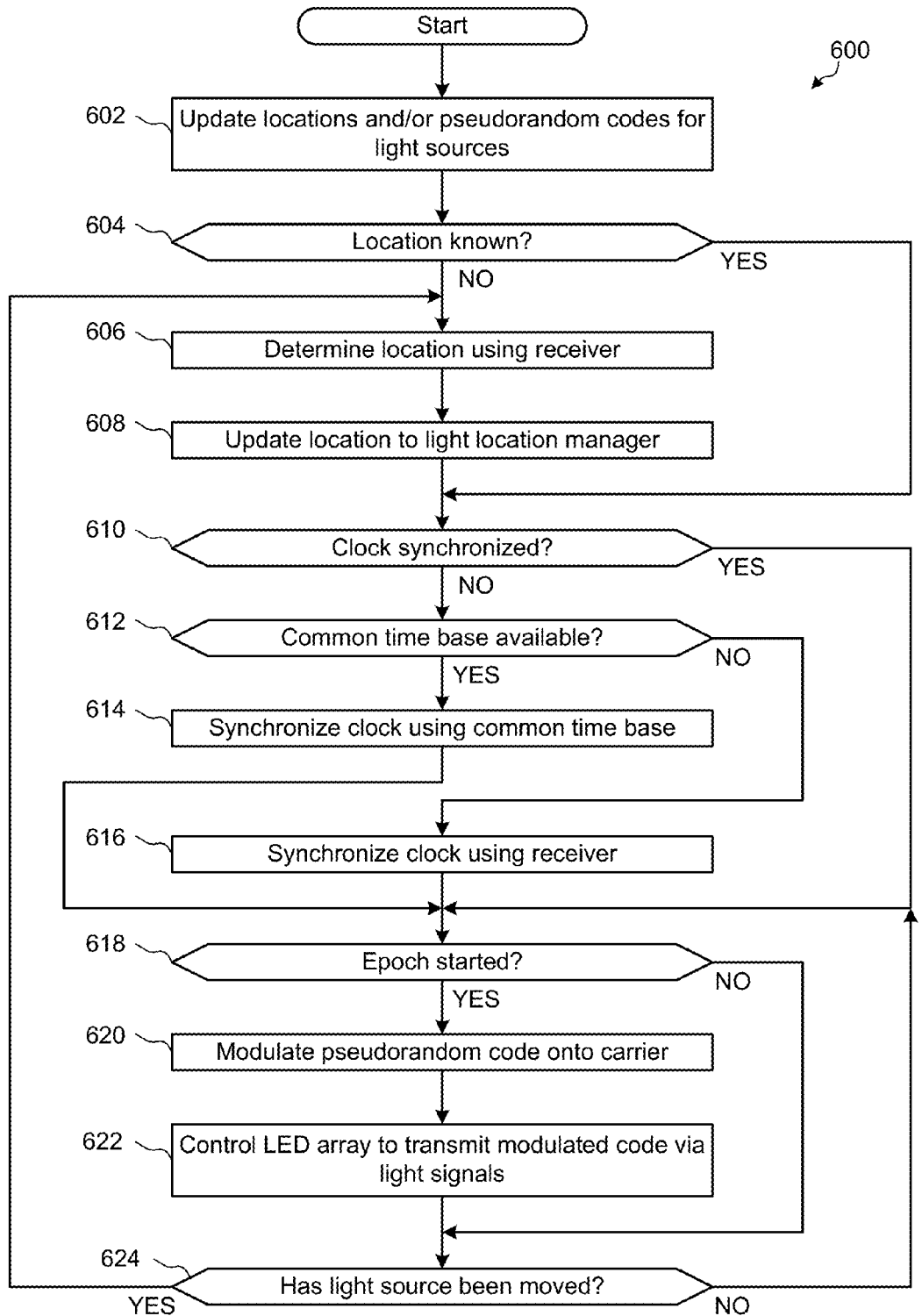
FIG. 6 is a flowchart of an example method to transmit codes from a light source to enable determination of locations of receiver devices.

A flowchart representative of an example method for implementing the receiver 122 of FIGS. 1-3 is shown in FIG. 5. A flowchart representative of an example method for implementing the light source 300 of FIG. 3 is shown in FIG. 6. In these examples, the methods may be implemented using machine readable instructions that comprise programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 5 and 6, many other methods of implementing the example receiver 122 and/or the example light source 300 may alternatively be used. For example, the order of execution of the blocks may be changed, and/or some of the blocks described may be changed, eliminated, or combined.

As mentioned above, the example methods of FIGS. 5 and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example methods of FIGS. 5 and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

FIG. 5 is a flowchart of an example method 500 to determine a position of a receiver device (e.g., the receiver 122 of FIGS. 1-3) using light sources (e.g., the light sources 104-112, 300 of FIGS. 1 and/or 3). The example method 500 is described with reference to the receiver 122 shown in FIG. 2 within the example system 100 of FIG. 1.

The example receiver 122 begins (e.g., at powering on the receiver 122) by updating location(s) and/or pseudorandom code(s) for the light sources (block 502). For example, the code book 206 may update its pseudorandom codes and/or locations associated with the light sources 104-112 in the area 116 by requesting an update from the light location manager 118 via the data communications interface 212 and/or the wireless access point 120.

The example code extractor 204 processes the output (e.g., an electrical signal) of the photodetector 202 to identify one or more pseudorandom codes (block 504). For example, the code extractor 204 may continuously process the electrical signal to determine a beginning of the transmission of one or more pseudorandom codes based on the light detected by the photodetector 202. In some examples, the code extractor 204 compensates for multi-path interference and/or other sources of error in the electrical signal. The number of pseudorandom codes that are detectable is based on a number of the light sources 104-112 in range of the receiver 122.

The example code extractor 206 determines whether any pseudorandom code(s) have been identified (block 506). If no pseudorandom codes have been identified (block 506), control returns to block 504 to continue processing the output of the photodetector 202. When one or more pseudorandom codes are identified (block 506), the example code extractor selects an identified pseudorandom code (block 508).

The example light source identifier 208 of FIG. 3 identifies the light source 104-112 associated with the selected code and the location of the identified light source 104-112 (block 510). For example, the light source identifier 208 looks up the selected unique pseudorandom code in the code book 206 to determine which of the light sources 104-112 is associated with (e.g., assigned) the selected pseudorandom code (block 510). The light source identifier 208 may also determine the location of the identified light source 104-112 from the code book 206, which may store the location in association with the pseudorandom code and the identification of the light source 104-112.

The example location determiner 210 determines a time of receipt of the selected pseudorandom code (block 512). For example, the location determiner 210 may obtain the code receive time from the code extractor 204, which is based on the clock 214.

Using the code receive time, the location determiner 210 determines a distance of the receiver 122 from the light source associated with the selected pseudorandom code (block 514). For example, the location determiner 210 multiplies the time between the expected transmission of the pseudorandom code by the associated light source 104-112 and the light propagation speed (e.g., a stored constant value, an algorithmically determined value, etc.) to determine the distance. If the clock 214 has not been recently synchronized, the calculated distance may have a significant error. The location determiner 210 stores the identification of the light source 104-112 (and/or the location of the light source) and the calculated distance from the receiver 122 to the light source 104-112 as a location data point (block 516).

The example location determiner 210 determines whether to synchronize the clock 214 (block 518). For example, the location determiner 210 may synchronize the clock 214 at designated intervals, when an error threshold is reached, and/or continuously. The location determiner 210 of FIG. 2 uses at least 5 location data points to synchronize the clock 214. If sufficient location data points have been collected to synchronize (block 518), the location determiner 210 synchronizes the clock 214 using the location data points (block 520). To synchronize the clock 214, the example location determiner 210 of FIG. 2 uses the expected code transmission times to determine a location and a time at which the code transmission times (e.g., by the light sources 104-112 at the known positions) and receipt times (e.g., by the receiver 122) are consistent with each other. As a result, in some examples, the location determiner 210 also uses the time synchronization process as a location determination process for the receiver 122. The example location determiner 210 then sets or resets the clock 214 of the receiver 122 to have a synchronized value with the light sources 104-112 based on the transmission time and the reception time of one or more of the pseudorandom codes.

After synchronizing the clock 214 (block 520), and/or if the clock 214 is not to be synchronized (block 518), the example location determiner 210 determines whether sufficient location data points have been collected to determine a location (block 522). For example, the location determiner 210 may require location data point from 3, 4, or more different ones of the light sources 104-112. In some examples, the location determiner 210 further determines whether the clock 214 has been synchronized less than a threshold time prior to block 522.

If there are sufficient location data points to determine a location of the receiver (block 522), the example location determiner 210 calculates a location of the receiver 122 (block 524). For example, the location determiner 210 determines the location by triangulating a position from the data points using the respective distances from the light sources 104-112 and the known locations of the light sources 104-112. In some examples, when more than 4 data points are available, the example location determiner 210 may discard or ignore some of the data points to reduce a calculated error in the position.

The location determiner 210 calculates a local or relative time from the location data points (block 526). For example, the location determiner 210 may use a demodulated and/or de-spread message from a light source 104-112 containing a transmission time of the pseudorandom code to determine a local time. After calculating the time from the location data points (block 526) or if insufficient location data points have been collected to determine the location (block 522), the code extractor 204 determines whether additional pseudorandom codes have been identified (block 528). If additional codes have been identified (block 528), control returns to block 508 to select another one of the identified codes. In contrast, if no additional codes have been identified (block 528), control returns to block 504 to process further output from the photodetector 202 to identify pseudorandom codes.

FIG. 6 is a flowchart of an example method 600 to transmit codes (e.g., pseudorandom codes) from a light source (e.g., the light sources 104-112, 300 of FIGS. 1 and/or 3) to enable determination of locations of receiver devices. The example method 600 is described with reference to the example light source 300 of FIG. 3 implementing the light source 104 in the system 100 of FIG. 1.

The example light source 300 (e.g., via the data communications interface 310, the time synchronizer 308, and/or the receiver 122) updates the locations and/or pseudorandom codes for the light sources 104-112 in the system 100 (block 602). The update to the locations may include a location of the light source 300 performing the method 600 (e.g., if the light source 300 is fixed at a location). The receiver 122 of FIG. 3 determines whether the location of the light source 300 is known (block 604). For example, the receiver 122 may determine a location of the light source 300 as described above with reference to FIG. 5 and/or may determine whether the location information for the light source 300 indicates that the location of the light source 300 is fixed.

If the location of the light source 300 is not known (e.g., the light source 300 has been moved) (block 604), the example receiver 122 determines the location of the light source 300 (block 606). Block 606 may be implemented by performing the method 500 of FIG. 5. The receiver 122 updates the determined location to the light location manager 118 (block 608). For example, the receiver 122 may transmit the location and time to the light location manager 118 via the data communications interface 310.

After updating the location (block 608), or if the location is already known (block 604), the example time synchronizer 308 determines whether the clock 312 is synchronized (block 610). For example, the time synchronizer 308 may determine that the clock 312 is not synchronized at powering on of the light source 300, if a timing error has been detected (e.g., the receiver 122 receives a pseudorandom code from another light source 300 at a time indicating a loss of synchronization), and/or if synchronization has not occurred in at least a threshold time.

If the clock 312 is not synchronized (block 610), the example time synchronizer 308 determines whether a common time base is available (block 612). For example, a common signal may be provided to each of the light sources 104-112 that can be used by the time synchronizer 308 to lock onto the phase. If a common time base is available (block 612), the example time synchronizer 308 synchronizes the clock 312 using the common time base (block 614).

In contrast, if a common time base is not available (block 612), the example time synchronizer 308 synchronizes the time base using the receiver 122 (block 616). For example, the time synchronizer 308 may synchronize the clock 312 as described above with reference to blocks 502, 504, 508-516, and 520 of FIG. 5. After synchronizing the clock 312 using the receiver 122 (block 616) or synchronizing the clock 312 using a common time base (block 614), or if the clock 312 is already synchronized (block 610), the code modulator 304 determines whether the epoch associated with the light source 300 has started (block 618). The epoch is the time during which the light source 300 is to transmit its unique pseudorandom code. In some examples, the epoch is the same for all of the light sources 104-112. In some other examples, the epochs are different for different light sources 104-112.

If the epoch has started (block 618), the code modulator 304 modulates a pseudorandom code provided by the code generator 306 onto a carrier frequency (block 620). In some examples, the code modulator 304 modulates the carrier to have a non-zero direct current (DC) component and a non-zero alternating current (AC) component, so that the LED array consistently provides light (e.g., does not go dark in view of a long string of 0 bits or chips). The code modulator 304 controls the LED array 302 to transmit the modulated code (e.g., at the carrier frequency) via light signals (block 622). For example, the code modulator 304 controls the current to the LED array 302 to cause the LED array 302 to vary its light output to transmit the pseudorandom code via the carrier frequency.

The example receiver 122 (or, for example, an accelerometer) determines whether the light source has moved (block 624). If the light source has not moved (block 624), control returns to block 618 to continue transmitting the pseudorandom code(s) during subsequent epochs for the light source 300. If the receiver 122 determines that the light source 624 has moved (block 624), control returns to block 606 to determine the new location using the receiver 122.

Figure 7:
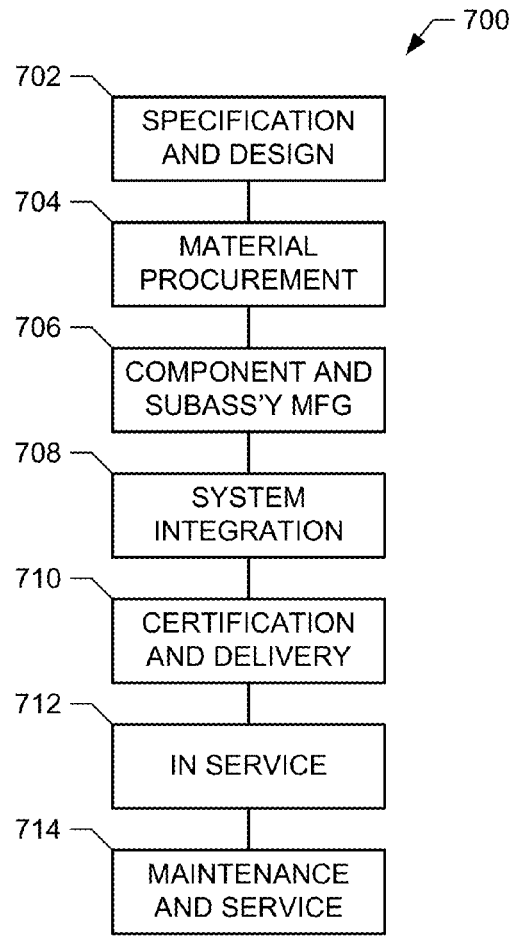
FIG. 7 is a flowchart of platform production and service methodology.
Figure 8:
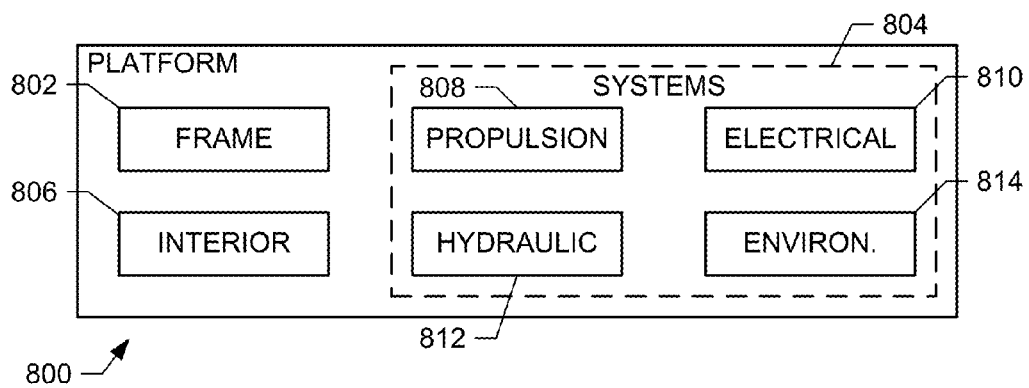
FIG. 8 is a block diagram of a platform.

Examples of the disclosure may be described in the context of a platform manufacturing and service method 700 as shown in FIG. 7 and a platform 800, such as an aircraft, as shown in FIG. 8. During pre-production, the example method 700 may include specification and design (block 702) of the platform 800 (e.g., an aircraft). Preproduction may further include material procurement (block 704). During production, component and subassembly manufacturing (block 706) and system integration (block 708) of the platform 800 (e.g., an aircraft) takes place. Thereafter, the platform 800 (e.g., an aircraft) may go through certification and delivery (block 710) in order to be placed in service (block 712). While in service by a customer, the platform 800 (e.g., an aircraft) is scheduled for routine maintenance and service (block 714), which may also include modification, reconfiguration, refurbishment, etc. The example system 100, the receiver 122, and/or the light sources 104-112 of FIG. 1, and/or the example methods of FIGS. 5 and/or 6, may be implemented during and/or in support of the maintenance and service procedures of block 714.

Each of the operations of the example method 700 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 8, the platform 800 (e.g., an aircraft) produced by example method 700 may include a frame 802 with a plurality of systems 804 and an interior 806. Examples of high-level systems 804 include one or more of a propulsion system 808, an electrical system 810, a hydraulic system 812, and an environmental system 814. The example systems and methods disclosed herein may be used during the manufacturing and/or maintenance stages (e.g., blocks 704, 706, 708, 710, and/or 714) to, for example, control manufacturing automation and/or monitor inventory. Any number of other systems may be included.

Apparatus and methods embodied herein may be employed during any one or more of the manufacturing and/or maintenance stages (e.g., blocks 704, 706, 708, 710, and/or 714) of the example method 700. For example, automated devices machining and/or assembling components or subassemblies corresponding to production process 706 may be controlled and/or moved based on determining their respective locations using the light sources and receivers disclosed herein. Also, one or more apparatus embodiments, method embodiments, or a combination thereof may be implemented during the production stages 706 and 708, for example, by substantially expediting assembly of or reducing the cost of a platform 800 (e.g., an aircraft) via automation. Similarly, one or more of apparatus embodiments, method embodiments, or a combination thereof may be utilized while the platform 800 (e.g., spacecraft) is in service 712, for example and without limitation, to maintenance and service 714, by automating all or a portion of the maintenance and/or service sub-processes.

Figure 9:
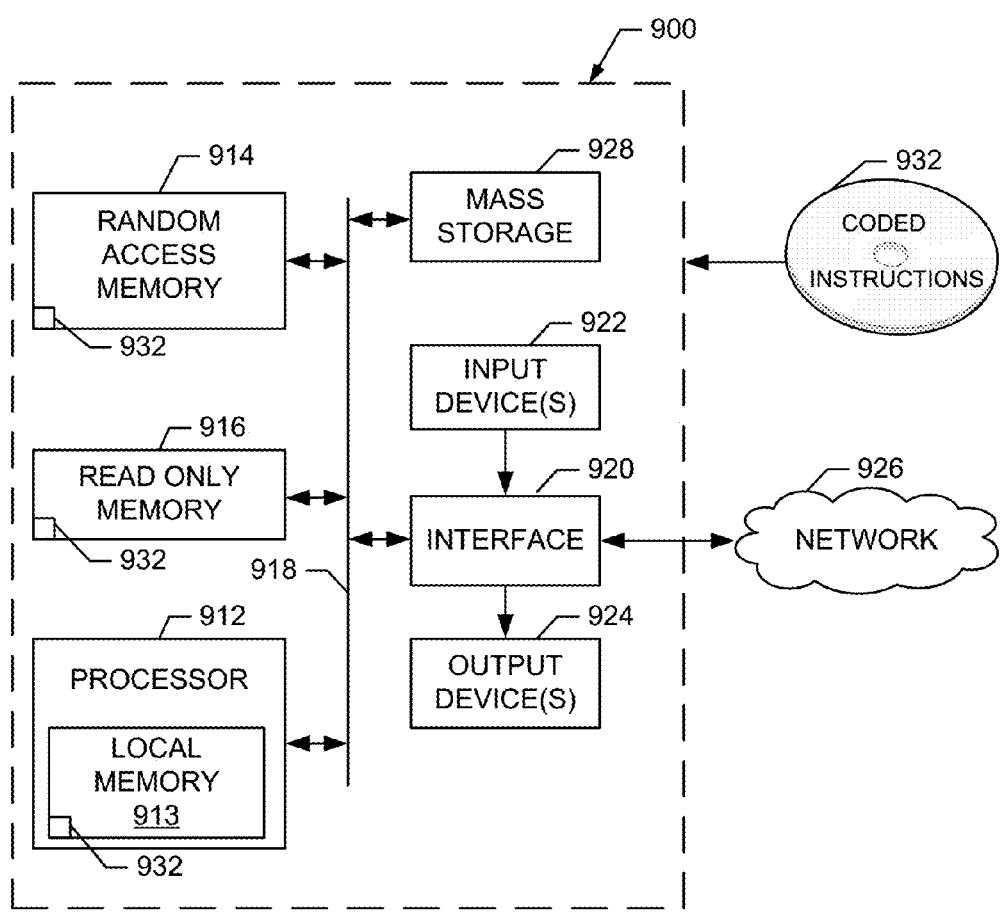
FIG. 9 is a block diagram of an example processor platform that may be used to implement the methods and apparatus described herein.

FIG. 9 is a block diagram of an example processor platform 900 to implement the methods of FIGS. 5 and 6, and/or to implement the light sources 104-112, the receiver 122, and/or the light location manager 118 of FIGS. 1, 2, and/or 3. The processor platform 900 can be, for example, a server, a personal computer, a laptop or notebook computer, a tablet computer, a mobile device, or any other type of computing device or combination of computing devices.

The processor platform 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory (e.g., read only memory (ROM) 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a voice recognition system, and/or any other method of input or input device.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a wireless local area network (WLAN) connection, coaxial cable, a cellular telephone system, etc.).

The processor platform 900 also includes one or more mass storage devices 928 for storing software and data. Examples of such mass storage devices 928 include floppy disk drives, hard drive disks, compact disk drives and digital versatile disk (DVD) drives.

Coded instructions 932 to implement the methods of FIGS. 5 and/or 6 may be stored in the mass storage device 928, in the volatile memory 914, in the non-volatile memory 916, and/or on a removable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   processing, via a logic circuit, an output of a photodetector based on anticipated codes to identify multiple light sources from which the photodetector receives light at a first position;
   determining, using the logic circuit, locations of the identified light sources; and
   determining a location of the first position based on the locations of the identified light sources, wherein determining the location of the first position comprises:
      calculating, for at least three of the anticipated codes, a distance between the photodetector and the light source associated with the anticipated code based on a time at which the anticipated code was received and an expected time of transmission by the light source associated with the anticipated code, and
      triangulating the location of the first position based on the calculated distances.

2. The method as defined in claim 1, further comprising determining the anticipated codes based on a code book or code sequences associated with the light sources.

3. The method as defined in claim 1, further comprising receiving the locations of the light sources via a data channel, and determining the locations of the identified light sources comprises determining the received locations associated with detected ones of the anticipated codes.

4. The method as defined in claim 1, further comprising determining a time difference between a time at which a first one of the anticipated codes is received and a reference time.

5. The method as defined in claim 1, wherein the light source comprises a visible light source in an indoor location.

6. The method as defined in claim 1, further comprising determining a time offset between the light source and the photodetector based on the output of the photodetector.

7. A method comprising:
   processing, via a logic circuit, an output of a photodetector based on anticipated codes to identify multiple light sources from which the photodetector receives light at a first position, wherein identifying the multiple light sources comprises:
      demodulating the output of the photodetector to generate a demodulated signal;
      correlating the demodulated signal to ones of the anticipated codes, and
      identifying a first one of the anticipated codes as being in the demodulated signal based on the demodulated signal having at least a threshold correlation with the first one of the anticipated codes;
   determining, using the logic circuit, locations of the identified light sources; and
   determining a location of the first position based on the locations of the identified light sources.

8. An apparatus, comprising:
   a photodetector to convert received light to an electrical signal;
   a code extractor to identify anticipated codes in the electrical signal;
   a light source identifier to identify multiple light sources and respective locations of the light sources based on the code extractor identifying the anticipated codes; and
   a location determiner to determine a location based on the identified light sources and the locations of the identified light sources, wherein the location determiner is to determine the location by:
      calculating, for at least three of the identified codes, a distance between the photodetector and the light source associated with the identified code based on a time at which the identified code was received and an expected time of transmission by the light source associated with the identified code; and
      triangulating a position based on the calculated distances.

9. The apparatus as defined in claim 8, wherein the location determiner is to determine a time based on one or more of the identified anticipated codes.

10. The apparatus as defined in claim 8, further comprising a data communications interface to receive the locations of the light sources via a data channel, the location determiner to determine the locations of the identified light sources by determining the received locations associated with detected ones of the anticipated codes.

11. The apparatus as defined in claim 8, further comprising a code book to store the anticipated codes, wherein a first one of the anticipated codes comprises a pseudorandom code associated with a first one of the light sources.

12. The apparatus as defined in claim 11, wherein the first one of the anticipated codes is different than any other ones of the anticipated codes.

13. The apparatus as defined in claim 8, wherein the location determiner is to synchronize a clock based on the code extractor identifying the anticipated codes.

14. The apparatus as defined by claim 8, wherein the code extractor is to identify the anticipated codes by demodulating the electrical signal and correlating a demodulated electrical signal to the anticipated codes.

15. A tangible computer readable storage medium comprising computer readable instructions which, when executed, cause a logic circuit to at least:
    process an output of a photodetector based on anticipated codes to identify multiple light sources from which the photodetector receives light at a first position, wherein the instructions are to cause the logic circuit to identify the multiple light sources by:
        demodulating the output of the photodetector to generate a demodulated signal;
        correlating the demodulated signal to ones of the anticipated codes, and
        identifying a first one of the anticipated codes as being in the demodulated signal based on the demodulated signal having at least a threshold correlation with the first one of the anticipated codes;
    determine locations of the identified light sources; and
    determine a location of the first position based on the locations of the identified light sources.

16. A tangible computer readable storage medium comprising computer readable instructions which, when executed, cause a logic circuit to at least:
    process an output of a photodetector based on anticipated codes to identify multiple light sources from which the photodetector receives light at a first position,
    determine locations of the identified light sources; and
    determine a location of the first position based on the locations of the identified light sources, wherein the instructions are to cause the logic circuit to determine the location of a first position by:
        calculating, for at least three of the anticipated codes, a distance between the light source associated with the anticipated code and the photodetector based on a time at which the anticipated code was received and an expected time of transmission by the light source associated with the anticipated code, and
        triangulating a position based on the calculated distances.

17. The storage medium as defined in claim 15, wherein the instructions are further to cause the logic circuit to synchronize a clock based on the anticipated codes and the locations of the light sources.

18. A method comprising:
    processing, via a logic circuit, an output of a photodetector based on anticipated codes to identify multiple light sources from which the photodetector receives light at a first position;
    synchronizing a time reference for the light sources;
    modulating the light sources to transmit respective pseudorandom codes in a synchronized manner via light pulses from respective ones of the light sources, each of the light sources transmitting a different pseudorandom code from others of the light sources;
    determining, using the logic circuit, locations of the identified light sources; and
    determining a location of the first position based on the locations of the identified light sources.

19. The storage medium as defined in claim 16, wherein the instructions are further to cause the logic circuit to synchronize a clock based on the anticipated codes and the locations of the light sources.

* * * * *